United States Patent
Shiung et al.

(10) Patent No.: US 8,854,526 B2
(45) Date of Patent: *Oct. 7, 2014

(54) IMAGE SENSOR DEVICE WITH OPAQUE COATING

(75) Inventors: Shin-Chang Shiung, Taichung (TW); Chieh-Yuan Cheng, Hsinchu (TW); San-Yuan Chung, Hsinchu (TW)

(73) Assignees: VisEra Technologies Company Limited, Hsinchu (TW); OmniVision Technologies, Inc., Santa Clara, CA (US)

( * ) Notice: Subject to any disclaimer, the term of this patent is extended or adjusted under 35 U.S.C. 154(b) by 724 days.

This patent is subject to a terminal disclaimer.

(21) Appl. No.: 12/244,431

(22) Filed: Oct. 2, 2008

(65) Prior Publication Data

US 2010/0085465 A1    Apr. 8, 2010

(51) Int. Cl.
*H04N 5/225*    (2006.01)
*G03B 17/00*    (2006.01)

(52) U.S. Cl.
CPC .............. *H04N 5/2252* (2013.01); *G03B 17/00* (2013.01)
USPC .......................................... 348/340; 348/373

(58) Field of Classification Search
USPC ............ 348/340, 335, 374, 75; 257/678, 644, 257/91, 98, 749, 666
See application file for complete search history.

(56) References Cited

U.S. PATENT DOCUMENTS

| | | | |
|---|---|---|---|
| 5,673,083 A | 9/1997 | Izumi et al. | |
| 6,980,250 B1 * | 12/2005 | Kayanuma et al. | 348/342 |
| 7,609,962 B2 * | 10/2009 | Chen | 396/535 |
| 2002/0109773 A1 * | 8/2002 | Kuriyama et al. | 348/36 |
| 2004/0095502 A1 * | 5/2004 | Losehand et al. | 348/340 |
| 2004/0228003 A1 * | 11/2004 | Takeyama et al. | 359/666 |
| 2005/0275741 A1 * | 12/2005 | Watanabe et al. | 348/340 |
| 2006/0181633 A1 * | 8/2006 | Seo | 348/340 |
| 2006/0280500 A1 | 12/2006 | Chen | |
| 2007/0091198 A1 * | 4/2007 | Watanabe et al. | 348/340 |
| 2007/0113441 A1 * | 5/2007 | Slowski | 40/550 |
| 2007/0236596 A1 * | 10/2007 | Sekine et al. | 348/340 |
| 2007/0242152 A1 * | 10/2007 | Chen | 348/345 |
| 2008/0073734 A1 * | 3/2008 | Kong | 257/432 |
| 2008/0252771 A1 * | 10/2008 | Wu | 348/340 |
| 2008/0296715 A1 * | 12/2008 | Kumata et al. | 257/432 |
| 2009/0079863 A1 * | 3/2009 | Aoki et al. | 348/374 |
| 2009/0316003 A1 * | 12/2009 | Hirsa et al. | 348/187 |

FOREIGN PATENT DOCUMENTS

| | | | | |
|---|---|---|---|---|
| CN | 1979243 | 6/2007 | | |
| JP | 2004-029590 | * | 1/2004 | G03B 17/02 |

* cited by examiner

*Primary Examiner* — Roberto Velez
*Assistant Examiner* — Stephen Coleman
(74) *Attorney, Agent, or Firm* — Muncy, Geissler, Olds & Lowe, P.C.

(57) ABSTRACT

The invention provides an image sensor device. The image sensor device includes a chip package and an opaque coating. The chip package includes an image sensor array chip, wherein a set of optical elements connect to the image sensor array chip, and an outer frame shielding the optical elements. The opaque coating overlies the outer frame.

20 Claims, 5 Drawing Sheets

IMAGE SENSOR DEVICE WITH OPAQUE COATING

BACKGROUND OF THE INVENTION

1. Field of the Invention

The invention relates to image sensor devices and more particularly to image sensor devices with opaque coatings.

2. Description of the Related Art

A conventional image sensor device is typically covered by a polymeric or metallic encapsulant to prevent unwanted light incidence into the device. However, an additional assembly process is required to assemble the polymeric or metallic encapsulant to the conventional image sensor device, increasing assembly costs. Further, due to the assembly of the polymeric or metallic encapsulant, the volume of the conventional image sensor device is increased, thus limiting miniaturization of electronic products using the conventional image sensor device.

When the conventional image sensor device has an aperture, during assembly, precise alignment between the aperture and the aperture opening of the polymeric or metallic encapsulant is critical to prevent the aperture from being completely or partly covered by the polymeric or metallic encapsulant. Despite the requirement however, precise alignment between the aperture and the aperture opening of the polymeric or metallic encapsulant cannot be inspected during the front-end assembly process of the conventional image sensor device. Thus, when non-precise alignment is identified during the back-end assembly process, rework or repair is difficult or impossible, lowering assembly yields.

Thus, a novel image sensor device is required to solve the described problems.

BRIEF SUMMARY OF THE INVENTION

An embodiment of the invention provides an image sensor device. The image sensor device includes a chip package and an opaque coating. The chip package includes an image sensor array chip, wherein a set of optical elements connect to the image sensor array chip and an outer frame shielding the set of optical elements. The opaque coating overlies the outer frame shielding.

An embodiment of the invention provides another image sensor device. The image sensor device includes a chip package and an opaque coating. The chip package includes an image sensor array chip, wherein a set of optical elements connect to the image sensor array chip, an outer frame shielding the set of optical elements, and a supporter connecting the set of optical elements with the outer frame. The opaque coating overlies the outer frame.

Further scope of the applicability of the invention will become apparent from the detailed descriptions given hereinafter. It should be understood however, that the detailed descriptions and specific examples, while indicating preferred embodiments of the invention, are given by way of illustration only, as various changes and modifications within the spirit and scope of the invention will become apparent to those skilled in the Art from the detailed descriptions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
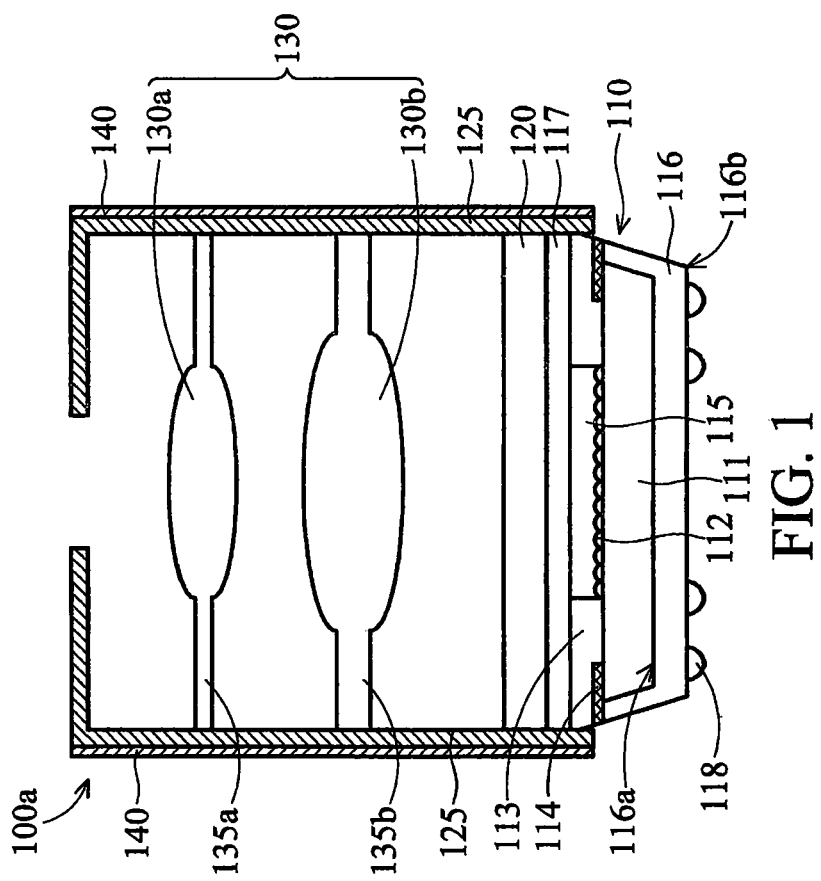
FIG. 1 shows a schematic cross-section of an image sensor device of a first embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

Next, the concepts and specific practice modes of the invention is detailedly described by the embodiments and the attached drawings. In the drawings or description, similar elements are indicated by similar reference numerals and/or letters. Further, the element shape or thickness in the drawings can be expanded for simplification or convenience of indication. Moreover, elements which are not shown or described can be in every form known by those skilled in the art.

Specific embodiments of the invention for fabrication of a chip scale package comprising an image sensor array chip are described. It is noted that the concepts of the invention can be applied to any known or newly developed package types of the image sensor array chip.

FIG. 1 is a cross section of an image sensor device 100a of a first embodiment of the invention. Referring to FIG. 1, an image sensor device 100a comprises a chip scale package 110 having an image sensor array chip 111, and a set of optical elements 130. An outer frame 125 is disposed overlying the chip scale package 110, shielding and connecting the set of optical elements 130. A transparent substrate 120 is disposed between the image sensor array chip 110 and the set of optical elements 130. In a preferred embodiment, the transparent substrate 120 is a cover glass. An opaque coating 140 is disposed overlying the outer frame 125 to prevent unwanted light incidence into the image sensor device 100a.

In one embodiment, the chip scale package 100 is a CMOS image sensor chip scale package. A transparent substrate 117 is configured as a support structure for the package 110. A CMOS image sensor chip 111 with an image sensor array 112 and electrode pads 114 are attached on the transparent substrate 117. In this embodiment, the transparent substrate 117 is disposed between the CMOS image sensor chip 111 and the set of optical elements 130. A dam structure 113 is interposed between the image sensor chip 111 and the transparent substrate 117 creating a gap 115 on the image sensor array 112. A protection layer 116 is attached to the CMOS image sensor chip 111. Specifically, a first surface 116a of the protection layer 116 is attached to the CMOS image sensor chip 111. Electrical connection traces (not shown) extend from the electrode pads 114 to a plurality of ball grids 118 overlying the second surface 116b, opposite to the first surface 116a, of the protection layer 116.

In an embodiment of the invention, the opaque coating 140 is disposed overlying the outer frame 125. The opaque coating 140 can be any opaque material, such as acrylic resin, epoxy resin or other organic polymers formed by spraying, spin coating, dipping, tapping, or sputtering to conformally overlie the outer frame 125. Unwanted environmental light is blocked or absorbed by the opaque coating 140, and thus, image defects such as 'ghosts' resulting from unwanted light incidence into the image sensor device 100a is decreased or eliminated. As a result, no polymeric or metallic encapsulant is required, decreasing the size of the image sensor device 100a.

In this embodiment, the set of optical elements 130 comprises a set of convex lenses 130a and 130b. In other embodiments, the set of optical elements 130 may comprise one single lens or more than two lenses, and the lens type can be properly selected as needed. In this embodiment, a supporter 135a connects the lens 130a of the set of optical elements and the outer frame 125 together, and a supporter 135b connects the lens 130b of the set of optical elements and the outer frame 125 together. In other embodiments, the lenses 130a and 130b may directly connect to the outer frame 125.

Figure 2:
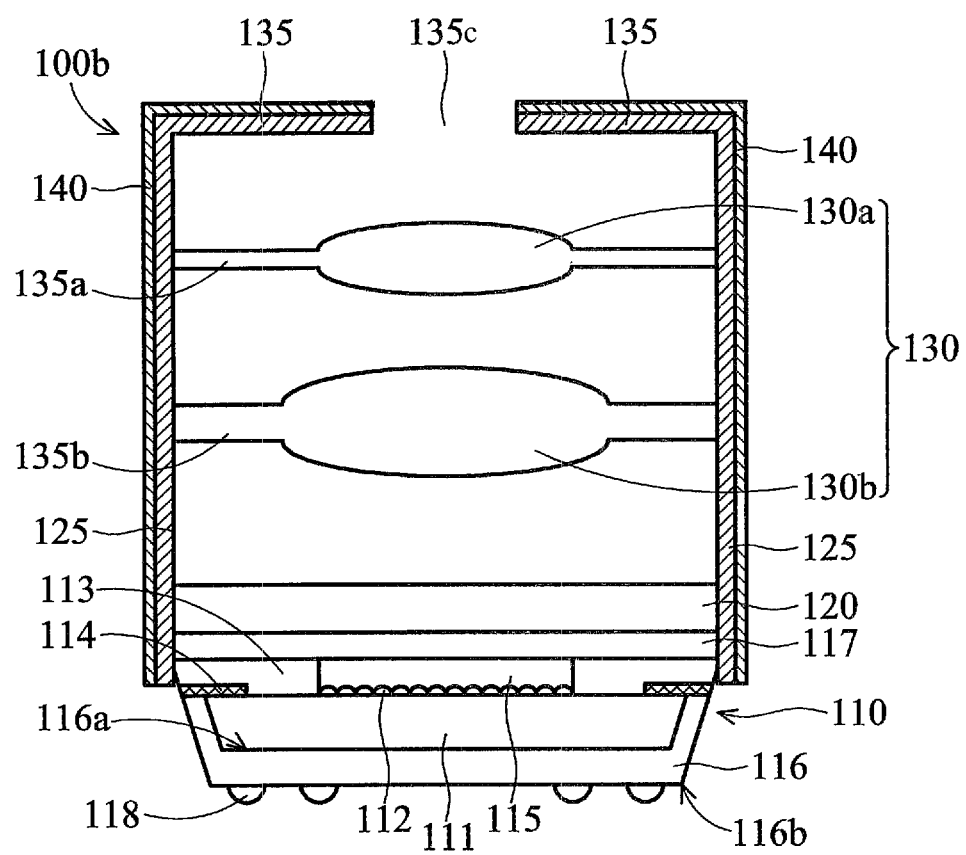
FIG. 2 shows a schematic cross-section of an image sensor device of a second embodiment of the invention.

FIG. 2 is a cross section of an image sensor device 100b of a second embodiment of the invention. The image sensor device 100b is nearly identical to the image sensor device 100a of the first embodiment, and for brevity, detailed descriptions of identical portions are omitted. The image sensor device 100b of this embodiment is different from the first embodiment in that the set of optical elements 130 further comprises a set of lenses 130a and 130b configured with an aperture module 135 comprising an aperture opening 135c exposing the set of lenses 130a and 130b. The opaque coating 140 further overlies the aperture module 135 and leaves the set of lenses 130a and 130b exposed.

Thus, before forming the opaque coating 140, the aperture opening 135c can be shielded or protected, and an etching, lift-off, self-aligning formation of the opaque coating 140 to the outer frame 125, or other patterning method can be performed to form the opaque coating 140 with an opening precisely aligned with the aperture opening 135c. Thus, the opaque coating 140 can be precisely aligned with the outer frame 125 with an opening precisely aligned with the aperture opening 135c, improving assembly yield of the image sensor device 100b.

Figure 3:
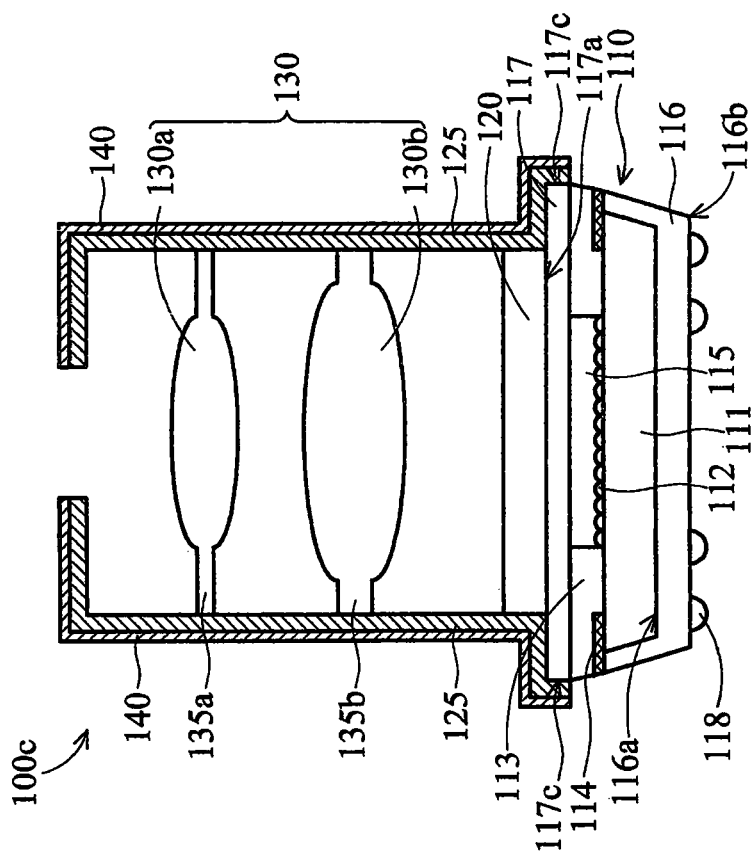
FIG. 3 shows a schematic cross-section of an image sensor device of a third embodiment of the invention.

FIG. 3 is a cross section of an image sensor device 100c of a third embodiment of the invention. The image sensor device 100c is nearly identical to the image sensor device 100a of the first embodiment, and for brevity, detailed descriptions of identical portions are omitted. The image sensor device 100c of the third embodiment is different from the first embodiment in that the footprint of the transparent substrate 117 is larger than that of the set of optical elements 130. Thus, the set of optical elements 130, or specifically the glass substrate 120, occupies parts of an upper surface 117a of the transparent substrate 117, and the outer frame 125 and the overlying opaque coating 140 extends to overlie the unoccupied parts of the upper surface 117a of the transparent substrate 117 to prevent unwanted light incident from the unoccupied parts of the upper surface 117a. Further, the outer frame 125 preferably extends to a side surface 117c of the transparent substrate 117 to prevent unwanted light incident from the side surface 117c.

Figure 4:
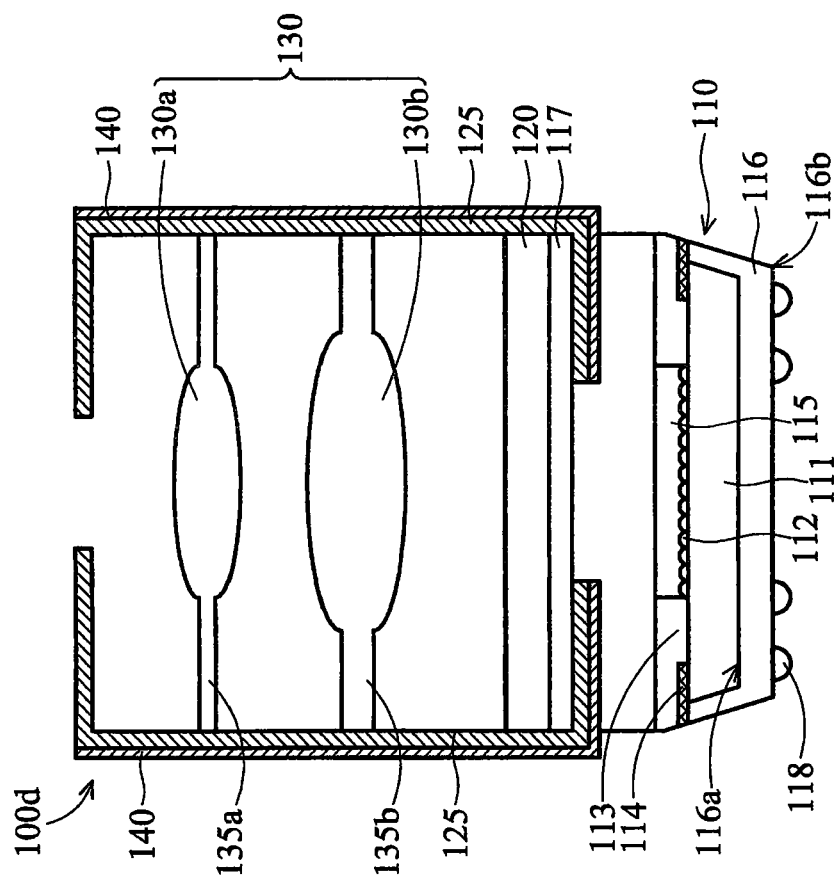
FIG. 4 shows a schematic cross-section of an image sensor device of a fourth embodiment of the invention.

FIG. 4 is a cross section of an image sensor device 100d of a fourth embodiment of the invention. The image sensor device 100d is nearly identical to the image sensor device 100a of the first embodiment, and for brevity, detailed descriptions of identical portions are omitted. The image sensor device 100d of the fourth embodiment is different from the first embodiment in that the footprint of the transparent substrate 117 is smaller than that of the set of optical elements 130. The outer frame 125 and the opaque coating 140 extend to be between the transparent substrate 117 and the set of optical elements 130, or specifically the glass substrate 120, and leave the image sensor array 112 of the CMOS image sensor chip 111 exposed. In this embodiment, the opaque coating 140 can be formed overlying the outer frame 125 before assembling the outer frame 125 and the chip scale package 110.

Figure 5:
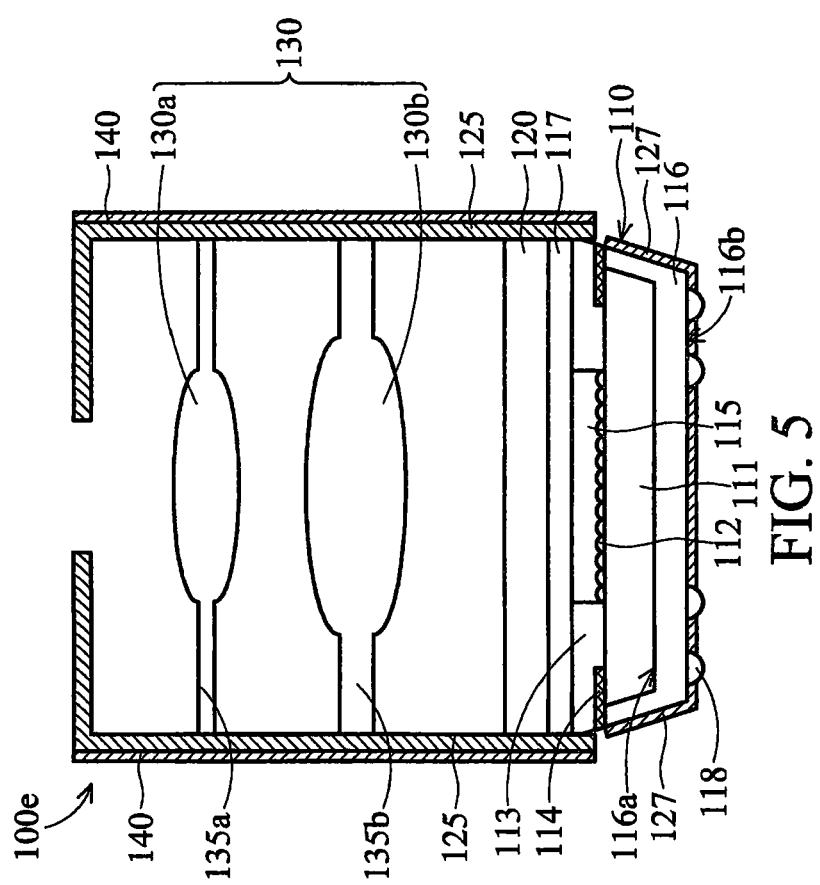
FIG. 5 shows a schematic cross-section of an image sensor device of a fifth embodiment of the invention.

FIG. 5 is a cross section of an image sensor device 100e of a fifth embodiment of the invention. The image sensor device 100e is nearly identical to the image sensor device 100a of the first embodiment, and for brevity, detailed descriptions of identical portions are omitted. The image sensor device 100e of the fifth embodiment is different from the first embodiment in that the image sensor device 100e further comprises an opaque layer 127 overlying the second surface 116b of the protection layer 116 to prevent unwanted light incident from the protection layer side of the chip scale package 110. The opaque layer 127 can be any opaque material, such as acrylic resin, epoxy resin or other organic polymers formed by spraying, spin coating, dipping, tapping, or sputtering to conformally overlie the second surface 116b of the protection layer 116. The opaque layer 127 and the opaque coating 140 can be formed with the same or different materials as required. Further, the opaque layer 127 and the opaque coating 140 can be formed simultaneously or formed in different steps as required. Moreover, the opaque layer 127 can be applied to any of embodiments shown in FIGS. 1 through 4 as required.

As described, due to the efficacy of the embodiments of the image sensor device of the invention, prevention of unwanted light incident, decreased device size, prevention of component misalignment, and increased assembly yields may be achieved.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. An image sensor device, comprising:
   a chip package comprising an image sensor array chip;
   a set of optical elements connecting to the image sensor array chip and configured with an aperture module;
   an outer frame overlying the image sensor array chip, shielding and connecting the set of optical elements;
   an opaque coating overlying the outer frame and the aperture module to prevent unwanted light incidence into the image sensor device and shield parts of regions over the set of optical elements, and comprising an opening precisely aligned with an aperture opening of the aperture module;
   a first transparent substrate between the image sensor array chip and the set of optical elements, wherein the image sensor array chip is attached on the first transparent substrate;
   a second transparent substrate between the first transparent substrate and the set of optical elements, wherein the second transparent substrate is spaced from the set of optical elements, and wherein the second transparent substrate occupies parts of an upper surface of the first transparent substrate; and
   a protection layer,
   wherein a first surface of the protection layer is attached to the image sensor array chip, and wherein the image sensor array chip is arranged between the first transparent substrate and at least a portion of the protective layer.

2. The device as claimed in claim 1, wherein the set of optical elements comprises a set of lenses configured with an aperture module and directly connected to the outer frame.

3. The device as claimed in claim 2, wherein the opaque coating leaves the set of lenses exposed by the aperture opening.

4. The device as claimed in claim 1, wherein
the footprint of the first transparent substrate is larger than that of the set of optical elements; and
the outer frame and the overlying opaque coating extend to overlie the unoccupied parts of the upper surface of the first transparent substrate.

5. The method as claimed in claim 4, wherein the outer frame further extends to a side surface of the first transparent substrate.

6. The device as claimed in claim 1, wherein the footprint of the first transparent substrate is smaller than that of the set of optical elements; and
the outer frame and the opaque coating extend to be between the first and second transparent substrates and leave an image sensor array of the image sensor array chip exposed.

7. The device as claimed in claim 1, further comprising an opaque layer, the opaque layer attached to a second surface, opposite to the first surface, of the protection layer.

8. The device as claimed in claim 1, wherein the opaque coating conformally overlies the outer frame and the aperture module due to spraying, spin coating, dipping, tapping, or sputtering.

9. The device as claimed in claim 1, wherein the opaque coating is an acrylic resin or epoxy resin overlying the outer frame and the aperture module.

10. The device as claimed in claim 1, wherein the opaque coating extends to an edge of the aperture opening of the aperture module, thus forming the opening of the opaque coating that is precisely aligned with the aperture opening of the aperture module.

11. An image sensor device, comprising:
a chip package comprising an image sensor array chip;
a set of optical elements connecting to the image sensor array chip and configured with an aperture module;
an outer frame overlying the set of optical elements, shielding and connecting the set of optical elements;
a supporter connecting the set of optical elements and the outer frame;
an opaque coating overlying the outer frame and the aperture module to prevent unwanted light incidence into the image sensor device and shield parts of regions over the set of optical elements, and comprising an opening precisely aligned with an aperture opening of the aperture module;
a first transparent substrate between the image sensor array chip and the set of optical elements, wherein the image sensor array chip is attached on the first transparent substrate;
a second transparent substrate between the first transparent substrate and the set of optical elements, wherein the second transparent substrate is spaced from the set of optical elements, and wherein the second transparent substrate occupies parts of an upper surface of the first transparent substrate; and
a protection layer,
wherein a first surface of the protection layer is attached to the image sensor array chip, and
wherein the image sensor array chip is arranged between the first transparent substrate and at least a portion of the protective layer.

12. The device as claimed in claim 11, wherein the set of optical elements comprises a set of lenses configured with an aperture.

13. The device as claimed in claim 12, wherein the opaque coating leaves the set of lenses exposed by the aperture opening.

14. The device as claimed in claim 11, wherein
the footprint of the first transparent substrate is larger than that of the set of optical elements; and
the outer frame and the overlying opaque coating extend to overlie the unoccupied upper surface of the first transparent substrate.

15. The device as claimed in claim 14, wherein the outer frame further extends to a side surface of the first transparent substrate.

16. The device as claimed in claim 11, wherein
the footprint of first the transparent substrate is smaller than that of the set of optical elements; and
the outer frame and the opaque coating extend to be between the first and second transparent substrates and leave an image sensor array of the image sensor array chip exposed.

17. The device as claimed in claim 11, further comprising an opaque layer, the opaque layer attached to a second surface, opposite to the first surface, of the protection layer.

18. The device as claimed in claim 11, wherein the opaque coating conformally overlies the outer frame and the aperture module due to spraying, spin coating, dipping, tapping, or sputtering.

19. The device as claimed in claim 11, wherein the opaque coating is an acrylic resin or epoxy resin overlying the outer frame and the aperture module.

20. The device as claimed in claim 11, wherein the opaque coating extends to an edge of the aperture opening of the aperture module, thus forming the opening of the opaque coating that is precisely aligned with the aperture opening of the aperture module.

* * * * *